D. PATTEE.
Corn Cultivator.
No. 201,627. Patented March 26, 1878.
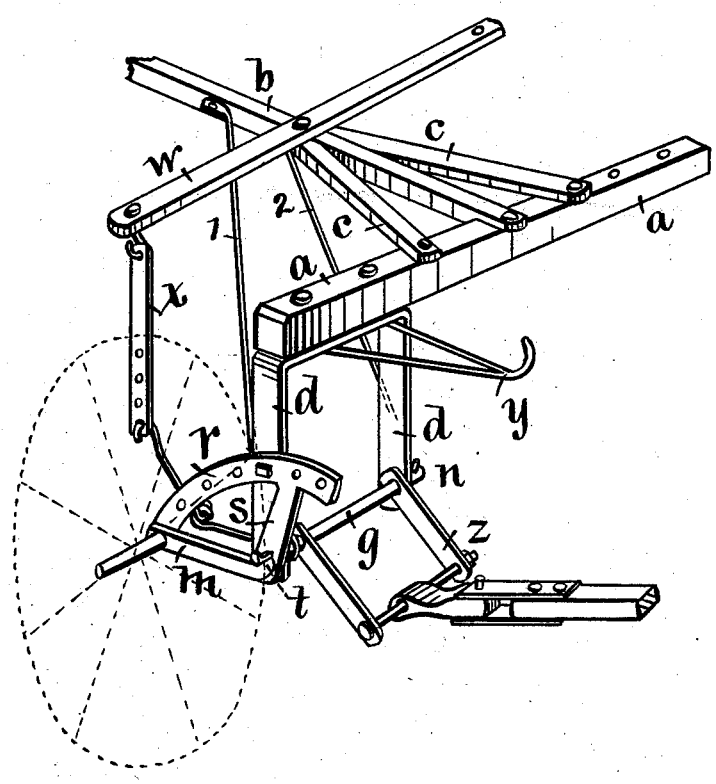
Witnesses:
Arthur Stimson.
P. C. Kenyon.
Inventor:
Davis Pattee,
By Thomas G. Orwig.
Attorney.

UNITED STATES PATENT OFFICE.

DAVIS PATTEE, OF DES MOINES, IOWA.

IMPROVEMENT IN CORN-CULTIVATORS.

Specification forming part of Letters Patent No. 201,627, dated March 26, 1878; application filed May 9, 1877.

*To all whom it may concern:*

Be it known that I, DAVIS PATTEE, of Des Moines, Iowa, have invented certain Improvements in Straddle-Row Corn-Cultivators, of which the following is a specification:

The object of my invention is to construct a cultivator in such a manner that the carriage can be readily raised and lowered on its wheels to adjust the beams of the cultivators without lifting or detaching them, and also to allow the wheels to rise over ridges and pass through furrows without lifting the plows or shovels of the cultivators from the ground, or sinking them deeper into the ground.

It consists in forming, arranging, and combining swinging beam-couplings with axles having cranks, segmental racks having cranks, a rigid carriage-frame, and rigidly-fixed axle-bearers, as hereinafter fully set forth.

My drawing is a perspective view, illustrating the construction and operation of my invention.

$a$ $b$ $c$ $c$ represent a rigid carriage-frame, composed of the elevated axle-bar $a$, the tongue $b$, and tongue-hounds $c$ $c$. $d$ $d$ is an axle-bearer, formed by bending a straight bar into the shape shown, and perforating its free ends to receive a stub-axle. Two corresponding bearers, $d$ $d$, are bolted to the under side and ends of the axle-bar $a$.

$g$ is the stub of a carriage-wheel axle, having a crank, $m$. The stub $g$ is passed through the perforations in the pendent ends of the bearer $d$ $d$ in such a manner that the crank $m$ will stand forward. It is secured in its bearings by means of a pin, $n$, or in any suitable way to allow it to be turned by means of its crank $m$.

$r$ is a perforated segmental rack, having a crank-arm, $s$, formed integral therewith. The crank-arm $s$ is perforated at its end, and rigidly secured to the stub of the axle $g$ by means of a key-seat and a key, $t$, or in any suitable way, and before the stub $g$ is placed in its bearings.

$w$ is an evener pivoted to the tongue $b$. $x$ $x$ are pendent and perforated bars for supporting and adjusting the single-trees, to which the horses are hitched. These bars $x$ are linked to the ends of the double-tree or evener $w$ by means of eyebolts, and connected, with linked bars or chains, to the stub-axles $g$ in any suitable way, to form a flexible connection between the pivoted evener and the rigid carriage-frame.

$y$ $y$ are hooks bolted to the axle-bar $a$, to project rearward, and for the purpose of supporting the cultivators in an elevated and inoperative position whenever desired.

1 2 represent braces rigidly fixed to the carriage-frame and the axle-bearers $d$ $d$, to strengthen the complete carriage.

$z$ is my swinging stirrup-form beam-coupling. It is suspended from the axle $g$ by passing the axle through the side pieces of the stirrup, or in any suitable way that will allow the stirrup a swinging motion when a cultivator is coupled thereto.

In the practical operation of my invention, when the standards of the cultivators are adjusted to set their plows or shovels into proper angles relative to the ground, as required to make them run at different depths, and to suit the varying conditions of the ground, the plow-beams are thereby alternately raised and lowered; and, in order to keep the beams and complete cultivators in a horizontal and level position, they must necessarily be adjusted at their front ends at the points where they are connected with the carriage.

By means of my swinging stirrup-form couplings being used in combination with segmental racks and stub-axles having cranks, I can readily raise and lower the complete carriage-frame, and thereby accommodate it to the various heights of the beams of the cultivators, by setting the axle-cranks $m$ at various angles relative to the upright bearers $d$ $d$; and to thus adjust the carriage-frame relative to its wheels and the cultivators coupled thereto, I simply change the bolts in the perforations of the racks $r$ to the right or to the left, and then again clamp the racks to the axle-bearers in a changed position.

The swinging couplings $z$ will accommodate themselves to the raising and lowering of the carriage-frame, so that the cultivators need not be uncoupled, and their weight will not be felt in adjusting the carriage-frame.

By means of my swinging stirrup-form couplings the carriage-wheels will at all times be allowed to rise and fall in passing over rough and furrowed ground, and to alternately raise and lower the rigid carriage-frame without disturbing the horizontal position of the cultivator-beams, because the swinging couplings $z$ accommodate themselves to the raising and lowering of the wheels and carriage-frame, and retain the beams and complete cultivators in a level position, as required, to keep the shovels or plows in the ground at a uniform depth while advancing across a field to stir the soil and clean it from weeds.

I am aware that axles having cranks have been used, in combination with adjustable racks of various forms, to raise and lower plow and cultivator carriage frames upon their wheels. But I claim that my swinging stirrup-form beam-coupling, a stub-axle having a crank, a segmental rack, and an axle-bearer having two rests for the axle, as arranged and combined with a rigid carriage-frame, to operate cultivators that require to be flexibly connected with a tractable carriage, are a novel and valuable improvement.

I claim as my invention—

1. The swinging stirrup-form couplings $z$, in combination with a cultivator-carriage and plow-beam, substantially as and for the purposes set forth.

2. In a wheel-cultivator, the combination of the carriage-frame $a\ b\ c$, the axle-bearers $d\ d$, the stub-axle $g$, having cranks $m$, the segmental racks $r\ s$, and the stirrup-form beam-couplings $z$, substantially as and for the purposes shown and described.

DAVIS PATTEE.

Witnesses:
 ARTHUR STIMSON,
 D. F. CALLENDER.